(12) United States Patent
Yang

(10) Patent No.: US 12,471,810 B2
(45) Date of Patent: Nov. 18, 2025

(54) HIGHLY INTEGRATED ANALYTE DETECTION DEVICE

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 631 days.

(21) Appl. No.: 17/801,239

(22) PCT Filed: Jul. 7, 2020

(86) PCT No.: PCT/CN2020/100604
§ 371 (c)(1),
(2) Date: Aug. 19, 2022

(87) PCT Pub. No.: WO2021/164185
PCT Pub. Date: Aug. 26, 2021

(65) Prior Publication Data
US 2023/0068002 A1 Mar. 2, 2023

(30) Foreign Application Priority Data
Feb. 20, 2020 (WO) ............... PCT/CN2020/075966

(51) Int. Cl.
*A61B 5/145* (2006.01)
*A61B 5/00* (2006.01)
*A61B 5/1473* (2006.01)

(52) U.S. Cl.
CPC ........ *A61B 5/14546* (2013.01); *A61B 5/0004* (2013.01); *A61B 5/14503* (2013.01);
(Continued)

(58) Field of Classification Search
CPC ............. A61B 5/1451; A61B 5/14532; A61B 2562/225; A61B 2562/227; A61B 5/14546; A61B 5/1486–14865
(Continued)

(56) References Cited

U.S. PATENT DOCUMENTS 7,494,465 B2 * 2/2009 Brister ................. A61B 5/6833
600/347
2003/0100040 A1 * 5/2003 Bonnecaze .......... A61B 5/0031
435/14
(Continued)

FOREIGN PATENT DOCUMENTS

CN 107361775 11/2017
CN 108078569 5/2018
(Continued)

OTHER PUBLICATIONS

"International Search Report (Form PCT/ISA/210) of PCT/CN2020/100604," mailed on Nov. 23, 2020, pp. 1-3.

*Primary Examiner* — Tse W Chen
*Assistant Examiner* — Alice Ling Zou
(74) *Attorney, Agent, or Firm* — JCIP GLOBAL INC.

(57) ABSTRACT

A highly integrated analyte detection device, includes: a bottom case; a sensor including a signal output portion and a detection portion; a transmitter provided with at least two second electrical connection ends which are corresponding to the first electrical connection ends; and a connection member, arranged between the first electrical connection ends and the second electrical connection ends, including at least two conductive areas and at least one insulation area. The insulation area is provided between two adjacent conductive areas, and at least two first electrical connection ends are respectively electrically connected to the corresponding second electrical connection ends.

14 Claims, 7 Drawing Sheets

(52) U.S. Cl.
CPC ........ *A61B 5/14532* (2013.01); *A61B 5/1473* (2013.01); *A61B 5/688* (2013.01); *A61B 2560/0214* (2013.01); *A61B 2560/0406* (2013.01); *A61B 2562/16* (2013.01)

(58) Field of Classification Search
USPC .................................................. 600/345, 347
See application file for complete search history.

(56) References Cited

U.S. PATENT DOCUMENTS

| | | | |
|---|---|---|---|
| 2010/0198033 A1* | 8/2010 | Krulevitch | A61B 5/14546 600/365 |
| 2010/0217093 A1 | 8/2010 | Ko et al. | |
| 2019/0117133 A1* | 4/2019 | Halac | A61M 15/0068 |
| 2020/0330036 A1* | 10/2020 | Barry | A61B 5/0024 |

FOREIGN PATENT DOCUMENTS

| | | |
|---|---|---|
| CN | 109475332 | 3/2019 |
| CN | 109998555 | 7/2019 |
| WO | 2017116915 | 7/2017 |
| WO | 2017176797 | 10/2017 |
| WO | 2018027940 | 2/2018 |

* cited by examiner

HIGHLY INTEGRATED ANALYTE DETECTION DEVICE

CROSS-REFERENCE TO RELATED APPLICATION

This application is a 371 of international application of PCT application serial no. PCT/CN2020/100604, filed on Jul. 7, 2020, which claims the priority benefit of PCT application serial no. PCT/CN2020/075966, filed on Feb. 20, 2020. The entirety of each of the above-mentioned patent applications is hereby incorporated by reference herein and made a part of this specification.

TECHNICAL FIELD

The present invention mainly relates to the field of medical device, and in particular, to a highly integrated analyte detection device.

BACKGROUND

The pancreas in a normal person can automatically monitor the amount of glucose in the blood and automatically secrete the required dosage of insulin/glucagon. However, for diabetic patients, the function of the pancreas is abnormal, and the pancreas cannot normally secrete required dosage of insulin. Therefore, diabetes is a metabolic disease caused by abnormal pancreatic function and also a lifelong disease. At present, there is no cure for diabetes, but the onset and development of diabetes and its complications can be controlled by stabilizing blood glucose.

Patients with diabetes need to check their blood glucose before injecting insulin into the body. At present, many detection devices can continuously detect blood glucose, and send the blood glucose data to the remote device in real time for the user to view. This detection method is called Continuous Glucose Monitoring (CGM). The method requires the detection device to be attached to the surface of the patient's skin, and the sensor of the device to be inserted into the subcutaneous tissue fluid for testing.

However, the current detection device is not compact, resulting in greater thickness and larger volume, affecting the user's dressing, stretching, exercise and other daily activities, which can seriously worsen user experience. Also, glucose monitoring can be easily interrupted with such a detection device because a bulky device can get bumped or caught easily, which may lead to data loss and pose a potential safety hazard to the user.

Accordingly, there is a need in the state of the art for a highly integrated analyte detection device with relatively simple internal structure and smaller volume.

BRIEF SUMMARY OF THE INVENTION

The embodiment of the present invention discloses a highly integrated analyte detection device. The connection member provided between the sensor and the transmitter includes a conductive area and an insulation area. The connection member simultaneously performs conduction and insulation, reducing the complexity of internal structure in the device and the size of the device, thus enhancing the user experience.

The invention discloses a highly integrated analyte detection device, including: a bottom case; a sensor, assembled on the bottom case, includes a signal output portion and a detection portion, and the signal output portion is provided with at least two first electrical connection ends; a transmitter, fastened with the bottom case, is provided with at least two second electrical connection ends which are corresponding to the first electrical connection ends; and a connection member, arranged between the first electrical connection ends and the second electrical connection ends, includes at least two conductive areas and at least one insulation area which cannot be separated from each other, and the insulation area is provided between two adjacent conductive areas, and at least two first electrical connection ends, through different conductive areas, are respectively electrically connected to the corresponding second electrical connection ends, and the different first electrical connection ends or the different second electrical connection ends are respectively electrically connected to the different conductive areas.

According to an aspect of the present invention, the second electrical connection ends are metal contact pins.

According to an aspect of the present invention, the second electrical connection ends are protruding metal contact pins with spherical top.

According to one aspect of the present invention, the connection member is provided with concave portions that cooperate with the protruding spherical tops of the protruding metal contact pins.

According to an aspect of the present invention, the metal contact pins are provided inside the transmitter, and the connection member is provided with protrusions that cooperate with the metal contact pins.

According to an aspect of the present invention, the second electrical connection ends are protruding plugs.

According to an aspect of the present invention, the connection member is provided with ports that cooperate with the protruding plugs.

According to an aspect of the present invention, the conductive area and the insulation area expand across the connection member in the vertical direction, respectively.

According to an aspect of the present invention, the first electrical connection end and the corresponding second electrical connection end share a common part of the conductive area.

According to an aspect of the invention, the common part of the conductive area includes a portion of one conductive area, or one conductive area, or more than one conductive area.

According to an aspect of the present invention, the insulation area is spaced between any two first electrical connection ends or any two second electrical connection ends connected to the connection member, and the spaced insulation area includes a portion of one insulation area, or one insulation area, or more than one insulation area.

According to an aspect of the present invention, the connection member is an elastic connection member.

According to an aspect of the present invention, the number of the first electrical connection end and the number of the second electrical connection end are both three.

According to an aspect of the present invention, the edge of the elastic connection member surrounds the positions where the first electrical connection end and the second electrical connection end are electrically connected with the elastic connection member, respectively.

According to an aspect of the present invention, the first electrical connection end is embedded inside the connection member.

According to an aspect of the present invention, the different first electrical connection ends are independent of each other and do not interfere with each other, and the embedding heights of the first electrical connection ends in the connection member are not exactly the same.

Compared with the prior art, the technical solution of the present invention has the following advantages:

In the highly integrated analyte detection device disclosed in the present invention, the connection member, disposed between the first electrical connection end and the second electrical connection end, includes at least two conductive areas and at least one insulation area which cannot be separated from each other, and the insulation area is provided between two adjacent conductive areas. Both conductive area and insulation area are disposed in a single connection member, thereby equipping one connection member with functions of both conduction and insulation. Therefore, the number of internal components of the detection device is reduced, making the internal structure of the detection device more compact, improving the integration of the detection device, and reducing the size of the detection device, which enhances the user experience. In addition, at least two first electrical connection ends, through different conductive areas, are respectively electrically connected to the corresponding second electrical connection ends. When more than two first electrical connection ends and second electrical connection ends are provided in the detection device, one or some of the first electrical connection ends are electrically connected to the corresponding second electrical connection ends by other means, which increases the flexibility of the electrical connection in the device.

Furthermore, the connection member is provided with concave portions that cooperate with the spherical tops of the protruding metal contact pins. This design also helps fixing the position of the connection member, that is, no matter what external force the detection device is subjected to, the position of the connection member is always fixed and no displacement occurs.

Furthermore, the first electrical connection end and the corresponding second electrical connection end share a common part of the conductive area. The common part of the conductive area includes more than one conductive area. When the number of conductive areas is large or the range is increased, the reliability of the electrical connection between the structures will be significantly improved.

Furthermore, the insulation area is spaced between any two first electrical connection ends or any two second electrical connection ends connected to the connection member, and the spaced insulation area includes more than one insulation area. When the number of insulation areas is large or the range is increased, the reliability of electrical insulation between structures is also significantly improved.

Furthermore, the connection member is an elastic connection member. The elastic connection member will be deformed under pressure, which helps obtain better electrical contact, and the elastic connection member can work as a buffer at the same time.

Furthermore, different first electrical connection ends are independent of each other and do not interfere with each other, and the embedding heights of the first electrical connection ends in the connection member are not exactly the same. In the actual manufacturing process, the thickness of each first electrical connection end will be different. When the transmitter is connected to the sensor, the independent and non-interfering first electrical connection ends can reduce or eliminate the effect of poor contact caused by the above thickness difference, which improves the reliability of the electrical connection among the connection member, the first electrical connection ends and the second connection ends.

BRIEF DESCRIPTION OF THE DRAWINGS

FIG. 4a is a top view, and FIG. 4b is a side view of the structure in FIG. 4a;

FIG. 7b is a cross-sectional view of the elastic connection member taken along the section line A-A' in FIG. 7a;

FIG. 8b is a cross-sectional view taken along the section line B-B' in FIG. 8a;

FIG. 9b is a cross-sectional view taken along the section line C-C' in FIG. 9a;

FIG. 10b is a schematic diagram of the connection member and the signal output portion matched with the second electrical connection end in FIG. 10a.

DETAILED DESCRIPTION

Figure 1:
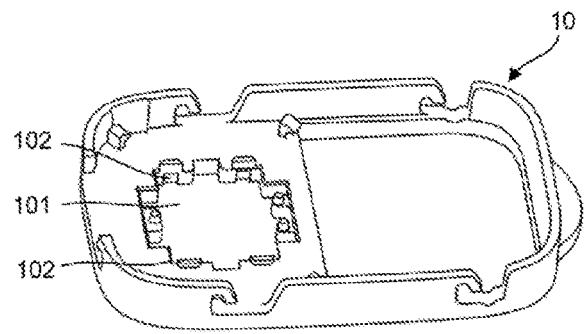
FIG. 1 is a schematic diagram of a bottom case according to an embodiment of the present invention.

As mentioned above, the body fluid parameter detection device of the prior art, with a large volume, can get easily bumped or caught when attached on the skin surface, which worsens user experience and brings inconvenience to the patient's life.

According to research, it is found that the above-mentioned problems are caused by the multiple conductive components between the transmitter and the sensor, and additional insulation components provided to separate adjacent conductive components. The internal structure of the detection device is complicated and not compact enough, resulting in lower integration and larger volume of the detection device.

In order to solve this problem, the present invention provides a highly integrated analyte detection device, and the connection member provided between the sensor and the transmitter includes the conductive area and the insulation area. The connection member performs both conduction and insulation, reducing the complexity of internal structure in the device and the size of the device, thus enhancing the user experience.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, the width, the length or the distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in following description of the drawings.

FIG. 1 is a schematic diagram of a bottom case 10 according to the embodiment of the present invention.

The bottom case 10 is used to assemble the sensor 113 and the transmitter 12. In the embodiment of the present invention, the bottom board of the bottom case 10 is provided with an assembly hole 101 for assisting the installation of the sensor 113, and a first fastening structure 102 is provided around the assembly hole 101 to help fasten the sensor 113 on the bottom case 10. The side wall of the bottom case 10 is further provided with a fastening portion (not labeled) for fixing the transmitter 12.

In another embodiment of the present invention, the bottom case 10 may have other shapes. For example, the bottom case 10 has only one side wall for fitting the sensor 113. A fastening portion for fixing the transmitter 12 is provided on the bottom board of the bottom case 10, and the transmitter 12 is installed on the bottom case 10 by sliding or other means.

In other embodiments of the present invention, the bottom case 10 may have other different shapes, as long as the condition for fixing the transmitter 12 on the bottom case 10 can be satisfied, which is not specifically limited herein.

Figure 2:
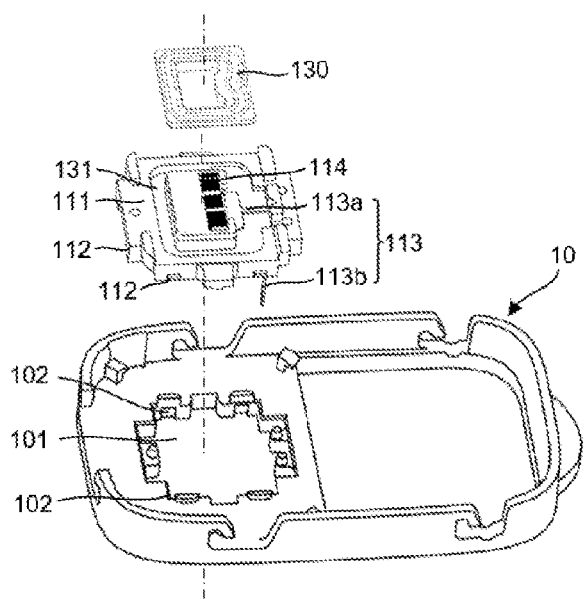
FIG. 2 is a schematic diagram of the assembly of a sensor and a bottom case according to an embodiment of the present invention.

FIG. 2 is a schematic diagram of the assembly of the sensor 113 and the bottom case 10 according to the embodiment of the invention.

There are multiple methods to assemble the sensor 113 on the bottom case 10, which is not specifically limited herein. Specifically, in the embodiment of the present invention, the sensor 113, carried by the sensor base 111, is assembled on the bottom case 10, and the second fastening structure 112 is provided around the sensor base 111. The second fastening structure 112 and the first fastening structure 102 are fastened with each other to install the sensor base 111 in the assembly hole 101, thus assembling the sensor 113 on the bottom case 10.

In another embodiment of the present invention, after the sensor 113 is assembled on the bottom case 10, the auxiliary mounting structure of the sensor 113 is removed, which means the sensor 113 is directly assembled on the bottom case 10 without the support of the sensor base 111 or other supporting structures. For example, the sensor 113 is assembled on one side of the bottom case 10 and is attached to the above-mentioned side wall of the bottom case 10.

In other embodiments of the present invention, the sensor 113 may also be assembled on the bottom case 10 using other assembly methods, which is not specifically limited herein.

Referring to FIG. 2, the sensor 113 includes a signal output portion 113a and a detection portion 113b. The signal output portion 113a needs to be electrically connected to the second electrical connection end 122 of the transmitter 12 to transmit the detection signal to the transmitter 12. The detection portion 113b is used to penetrate the subcutaneous tissue of the human body to detect the analyte parameter.

The signal output portion 113a is provided with the first electrical connection ends 116. Conventionally, the sensor 113 is further provided with electrodes and/or electrode leads (not labeled here and below) for detecting or transmitting the analyte parameter. The detection signal of the electrode is transmitted through the first electrical connection ends 116.

It should be noted that the embodiment of the present invention does not limit the arrangement method of the first electrical connection ends 116 on the signal output portion 113a. For example, the first electrical connection ends 116 may be disposed on the surface of the signal output portion 113a or embedded in the signal output portion 113a.

Generally, at least two detection electrodes are provided on the sensor 113, that is, the sensor 113 at least includes a working electrode and a counter electrode. Therefore, in the embodiment of the present invention, at least two first electrical connection ends 116 are provided on the surface of the signal output portion 113a to be electrically connected to different electrodes. Specifically, in the embodiment of the present invention, the sensor 113 is a three-electrode system. Therefore, the number of the first electrical connection ends 116 is three.

As depicted in FIG. 2, in the embodiment of the present invention, the sensor 113 is curved. The signal output portion 113a is attached to the surface of the sensor base 111 or embedded in the sensor base 111, which reduces the height of the part of the sensor 113 protruding from the bottom case 10, and thus reduces the thickness of the detection device.

In other embodiments of the present invention, the sensor 113 may also have other shapes or forms (such as non-curved), which is not specifically limited herein.

Figure 3:
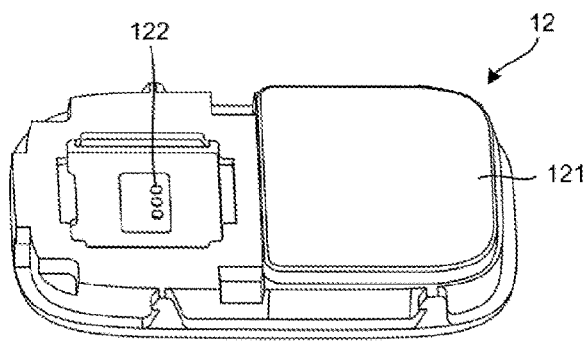
FIG. 3 is a schematic diagram of a transmitter according to an embodiment of the present invention.

FIG. 3 is a schematic diagram of a transmitter 12 according to an embodiment of the present invention.

The transmitter 12 is provided with the second electrical connection ends 122. The second electrical connection ends 122 are used to electrically connect with the first electrical connection ends 116, and thus receive the electrical signal from the sensor 113. Therefore, the second electrical connection ends 122 correspond to the first electrical connection ends 116.

Here, the correspondence means that these two are equal in number and their positions basically correspond. Obviously, in the embodiment of the present invention, the number of the second electrical connection ends 122 is three, to be compatible with the three-electrode system of the sensor 113.

In the embodiment of the present invention, the second electrical connection ends 122 are exposed and protrude from the transmitter case 121 so as to make electrical contact with the corresponding first electrical connection ends 116. Specifically, in the embodiment of the present invention, the second electrical connection ends 122 are metal contact pins. The small size of the metal contact pins make the internal structure of the detection device more compact, thereby reducing the volume of the detection device.

It should be noted that the embodiment of the present invention does not limit the shape and position of the second electrical connection ends 122, and the positional relationship between the second electrical connection ends 122 and the transmitter case 121. As in one embodiment of the present invention, the second electrical connection ends are disposed on one side of the transmitter, so the electrical connection position of the connection member with the first electrical connection ends and the second electrical connection ends is located on one side of the detection device. In another embodiment of the present invention, the second electrical connection ends are flush with the surface of the transmitter case 121 instead of protruding from it. In still another embodiment of the present invention, the second electrical connection ends 122 are located inside the transmitter case 121, which will be described in detail below. As in yet another embodiment of the present invention, the cross section of the second electrical connection ends is rectangular or circular. In still another embodiment of the present invention, the conductive portion of the second electrical connection ends 122 is coated or plated on the surface of some plugs, or the second electrical connection ends 122 themselves are the plugs. The plugs can be inserted into the connection member, which will be described in detail below.

Figure 4A:
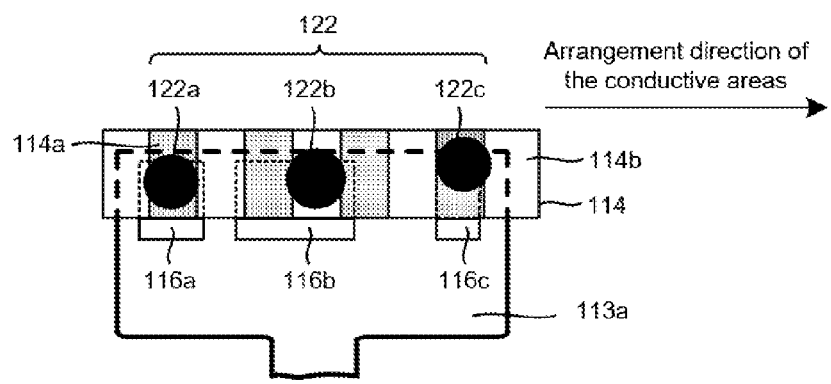
FIG. 4a-FIG. 4b are schematic diagrams of a connection member, the first electrical connection ends, and the second electrical connection ends according to an embodiment of the present invention.
Figure 4B:
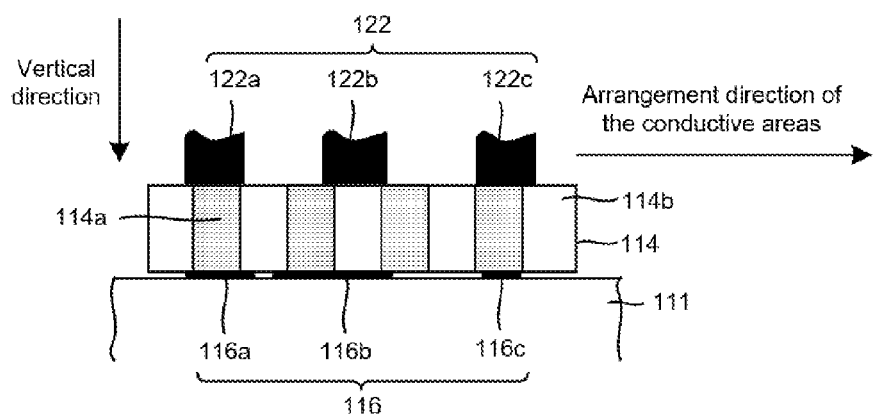
Figure 4C:
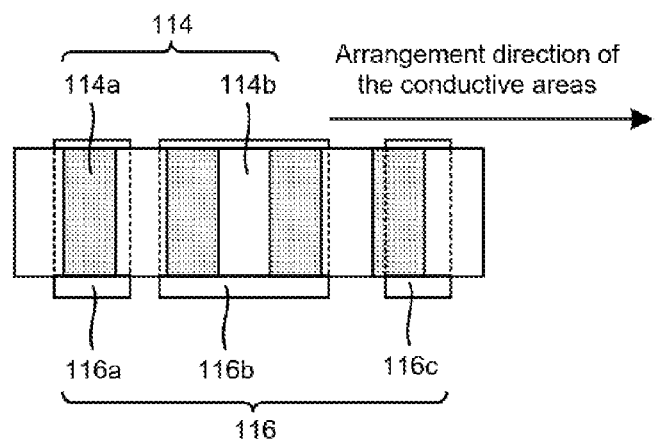
FIG. 4c is a top view of a connection member and first electrical connection ends according to another embodiment of the invention.
Figure 4D:
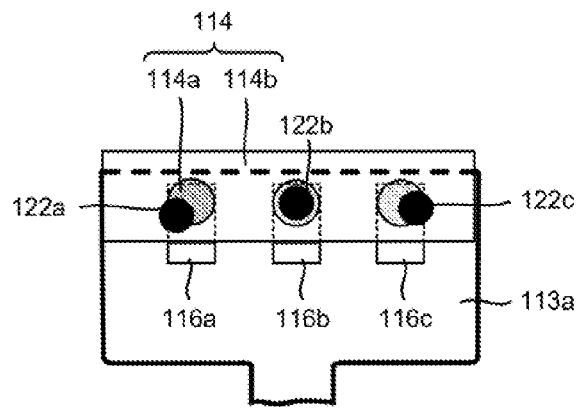
FIG. 4d-FIG. 4e are top views of a connection member, the first electrical connection ends, and the second electrical connection ends according to different embodiments of the invention.
Figure 4E:
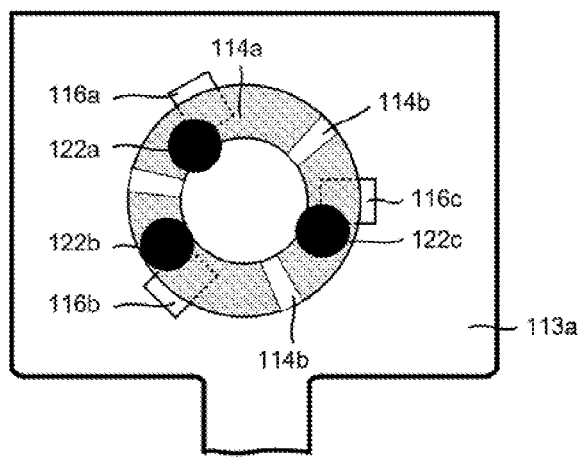

FIG. 4a is a top view of the connection member, the first electrical connection ends, and the second electrical connection ends according to an embodiment of the present invention. FIG. 4b is a side view of the connection member in FIG. 4a. FIG. 4c is a top view of a connection member and first electrical connection ends according to another embodiment of the invention. FIG. 4d-FIG. 4e are top views of the connection member, the first electrical connection ends, and the second electrical connection ends according to other different embodiments of the present invention.

Firstly, it should be pointed out that the thin dashed line in FIG. 4a represents the outline of part of the first electrical connection ends covered by the connection member, while the thick dashed line represents the outline of part of the signal output portion covered by the connection member. The thin dashed line and the thick dashed line in the subsequent drawings have the same meanings, which will not be repeated.

The connection member 114 is disposed between the first electrical connection ends 116 and the second electrical connection ends 122 to achieve electrical connection between the two. Therefore, the connection member 114 must include a conductive portion to electrically connect the corresponding first electrical connection ends 116 and the second electrical connection ends 122.

Therefore, the connection member 114 includes at least two conductive areas 114a and at least one insulation area 114b. The conductive area 114a and the insulation area 114b are used to perform electrical conduction and electrical insulation, respectively. The conductive area 114a and the insulation area 114b cannot be separated from each other, that is, the conductive area 114a and the insulation area 114b belong to the whole part of the connection member 114, respectively.

An insulation area 114b is provided between adjacent conductive areas 114a. The different first electrical connection ends 116 or the different second electrical connection ends 122 are electrically connected to the different conductive areas 114a, respectively, thus making any two first electrical connection ends 116 or any two second electrical connection ends 122 insulated from each other.

Inside the connection member 114, the conductive area 114a and the insulation area 114b expand across the connection member 114 in the vertical direction, as shown in FIG. 4b. Here, the vertical direction refers to the direction from the first electrical connection end 116 to the corresponding second electrical connection end 122, or the current direction between them. After the first electrical connection end 116 and the second electrical connection end 122 are electrically connected, such a design ensures that the connection member 114 can only conduct electricity in the vertical direction, but not in the longitudinal direction. Therefore, the connection member 114 is used for electrically connecting the first electrical connection end 116 and the corresponding second electrical connection end 122 while electrically insulating the different first electrical connection ends 116 or the different second electrical connection ends 122. The single connection member 114 can perform electrical conduction and electrical insulation at the same time, thus reducing the complexity of the internal structure of the detection device, making the internal structure more compact, and improving the integration of the detection device.

It should be noted that in other embodiments of the present invention, the conductive area 114a or the insulation area 114b may also have a certain inclination, or be arranged inside the connection member 114 in other directions or manners, which is not specifically limited herein, as long as the above-mentioned conditions of electrical conduction and electrical insulation are satisfied.

Referring to FIG. 2, FIG. 4a and FIG. 4b together, specifically, in the embodiment of the present invention, the connection member 114 has a rectangular structure. The conductive area 114a and the insulation area 114b are arranged alternately and both penetrate the connection member 114. In another embodiment of the present invention, different conductive areas 114a are arranged within the same insulation area 114b, that is, are surrounded by one single insulation area 114b as shown in FIG. 4d. In still another embodiment of the present invention, the top view of the connection member 114 may be ring-shaped, as shown in FIG. 4e. In yet another embodiment of the present invention, the top view of the connection member 114 may be round.

In other embodiments of the present invention, the connection member 114 may have other shapes, which is not specifically limited herein, as long as the conditions for achieving the above-mentioned functions of the connection member 114 can be satisfied.

Please continue to refer to FIG. 4a and FIG. 4b, when the connection member 114 is electrically connected to the first electrical connection ends 116 and the second electrical connection ends 122 respectively, the insulation area 114b is located between any two first electrical connection ends 116 which are connected to the connection member 114. Preferably, in the embodiment of the present invention, the insulation area 114b spaced between any two first electrical connection ends 116 includes a portion of an insulation area 114*b* (as between 116*a* and 116*b* shown in FIG. 4*a* and FIG. 4*b*), or one insulation area 114*b*, or more than one insulation area 114*b* (as between 116*c* and 116*b* in FIG. 4*a* and FIG. 4*b*). Similarly, the insulation area 114*b* spaced between any two second electrical connection ends 122 connected to the connection member 114 includes a portion of one insulation area 114*b*, or one insulation area 114*b*, or more than one insulation area 114*b*. However, it is obvious that the first electrical connection end and the corresponding second electrical connection end (such as between 116*a* and 122*a*, 116*b* and 122*b*, or 116*c* and 122*c*) share a common part of the conductive area 114*a* to achieve the electrical conductivity. The common part of the conductive area includes a portion of one conductive area 114*a* (as between 116*c* and 122*c* in FIG. 4*a* and FIG. 4*b*), or one conductive area 114*a*, or more than one conductive area 114*a*.

Referring to FIG. 4*a* and FIG. 4*b*, those skilled in the art can easily understand that the above-mentioned part of one insulation area or conductive area, one insulation area or conductive area, and more than one insulation area or conductive area only represents the span range of the first electrical connection end or the second electrical connection end in one dimension in the drawings (such as the arrangement direction of the conductive areas).

In other embodiments of the present invention, a portion of one insulation area or one conductive area, one insulation area or one conductive area, and more than one insulation area or conductive area may also represent the range in the two-dimensional direction which is covered by the first electrical connection end or the second electrical connection end, as shown in FIG. 4*c*. Taking the first electrical connection end as an example, the dotted line in FIG. 4*c* represents a partial outline of the first electrical connection ends. Obviously, one first electrical connection end 116 can cover a part of one insulation area or one conductive area, or one insulation area or one conductive area, or more than one insulation area or conductive area.

Obviously, when the number of conductive areas or insulation areas between the above structures is large or the range is wide, the reliability of the electrical connection or electrical insulation between the structures will be significantly improved.

In the embodiment of the present invention, the connection member 114 is an elastic connection member whose material includes elastic plastic, elastic rubber, and the like. The elastic connection member 114 can obtain better electrical contact while acting as a buffer at the same time. When the material of the connection member 114 is elastic rubber, the connection member 114 is a conductive rubber strip which not only performs conduction and insulation, but also works as a buffer.

Obviously, when the sensor 113 is a two-electrode system, the number of the first electrical connection ends and the second electrical connection ends are both two. At this time, the connection member 114 only needs to include two conductive areas 114*a* and one insulation area 114*b* disposed between the two conductive areas 114*a*. That is, two pairs of different first electrical connection ends and second electrical connection ends are electrically connected through different conductive areas 114*a*, respectively, to achieve electrical conduction. At the same time, the two first electrical connection ends or the two second electrical connection ends are separated by the insulation area to achieve electrical insulation.

Figure 5:
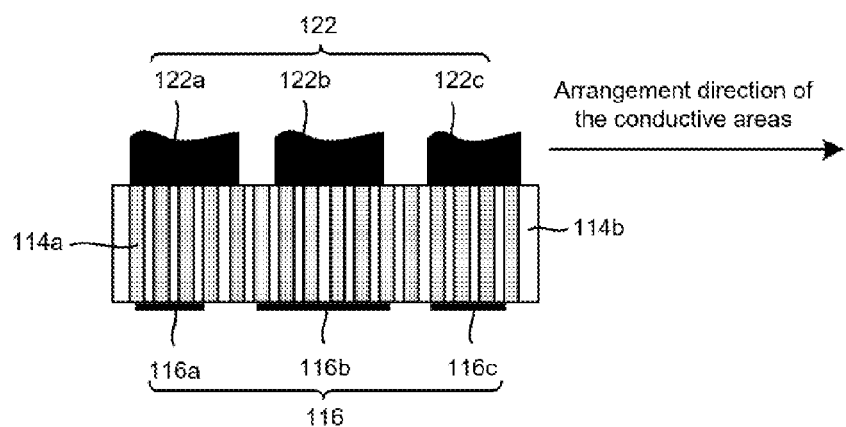
FIG. 5 is a schematic diagram of the connection member and first electrical connection ends and second electrical connection ends according to still another embodiment of the invention.

Sensors, in other embodiments of the present invention, may also include more electrodes. Therefore, the connection member 114 includes more conductive areas and insulation areas that are arranged alternately, which makes the electrical connection method more flexible, as shown in FIG. 5.

It should be noted that, in other embodiments of the present invention, the sensor includes at least three electrodes, that is, the signal output portion 113*a* is provided with at least three first electrical connection ends. And at least two of the first electrical connection ends, through different electrical conductive area 114*a*, are electrically connected to the corresponding second electrical connection ends, of which the connection method and principle are the same as above. In terms of other first electrical connection ends and second electrical connection ends that are not connected to the connection member 114, the embodiments of the present invention do not limit their connection manner or connection principle. As in an embodiment of the present invention, the sensor is a three-electrode system, in which only the working electrode and the counter electrode are electrically connected to the second electrical connection ends by the corresponding first electrical connection ends through the above-mentioned connection member, while the reference electrode is connected to the transmitter in other methods.

Figure 6A:
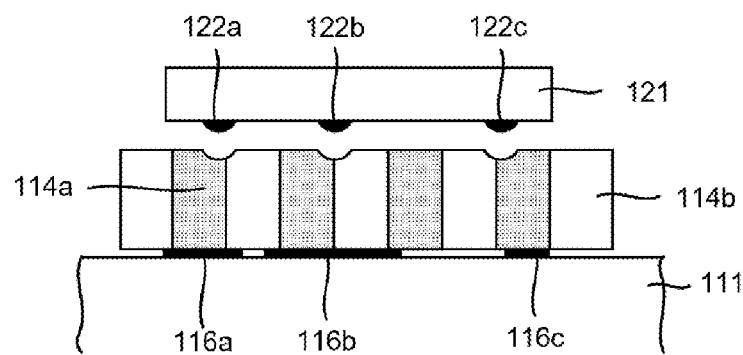
FIG. 6a-FIG. 6b are schematic diagrams of the electrical connection position between the second electrical connection ends and the connection member according to different embodiments of the present invention.
Figure 6B:
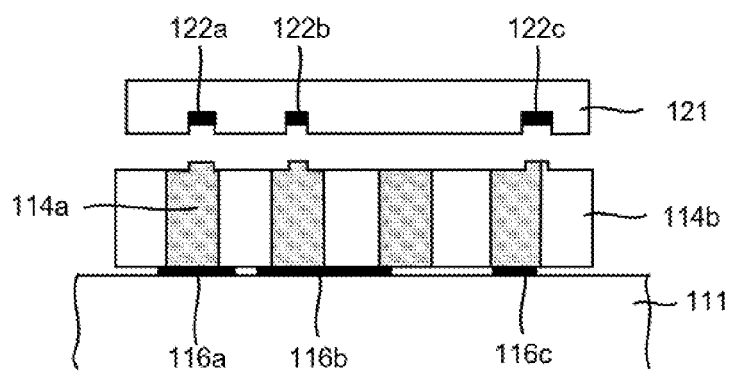

FIG. 6*a*-FIG. 6*b* are schematic diagrams of the electrical connection position between the second electrical connection ends 122 and the connection member 114 in different embodiments of the present invention.

For ease of labeling and description, the second electrical connection ends 122 and the connection member 114 in FIG. 6*a* and FIG. 6*b* will be shown separately.

As shown in FIG. 6*a*, in the embodiment of the present invention, the second electrical connection ends 122 are protruding metal contact pins with spherical top. Correspondingly, the connection member 114 is provided with concave portions (not labeled) at the positions where it is connected to the protruding metal contact pins to improve contact and connection. At the same time, the connection between these protruding pins and the concave portions also helps in fixing the position of the connection member 114, that is, no matter what external force is applied to the detection device, the position of the connection member 114 is always fixed without any displacement, ensuring that the connection member 114 performs normally.

It should be noted that if the connection member 114 is an elastic connection member, the connection member 114 may not include concave portions. When pressed by the protruding metal contact pins, concave portions will be formed on the surface of the elastic connection member to match the metal contact pins, ensuring the function of electrical connection or electrical insulation.

As shown in FIG. 6*b*, in another embodiment of the present invention, the second electrical connection ends 122 are disposed inside the transmitter 12. At this time, the connection member 114 is correspondingly provided with protrusions or square bulges (not labeled), which can enter the interior of the transmitter 12 and be electrically connected to the corresponding second electrical connection ends 122.

Figure 7A:
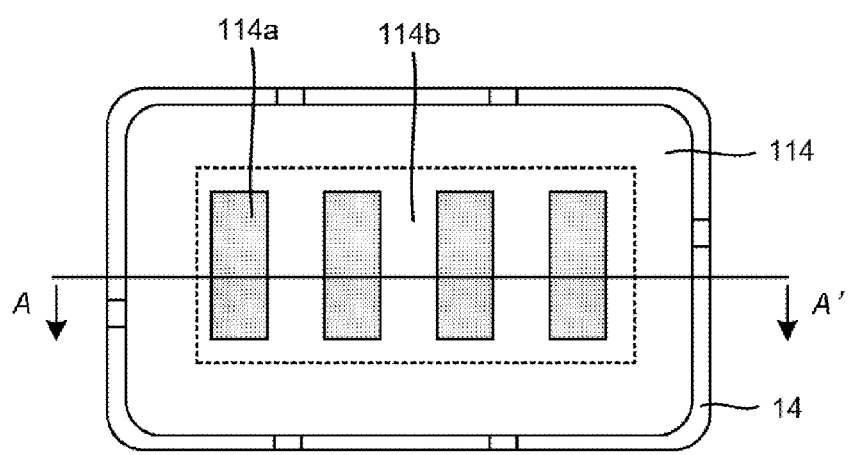
FIG. 7a-FIG. 7b are schematic diagrams of an elastic connection member also acting as a sealing member according to yet another embodiment of the present invention.
Figure 7B:
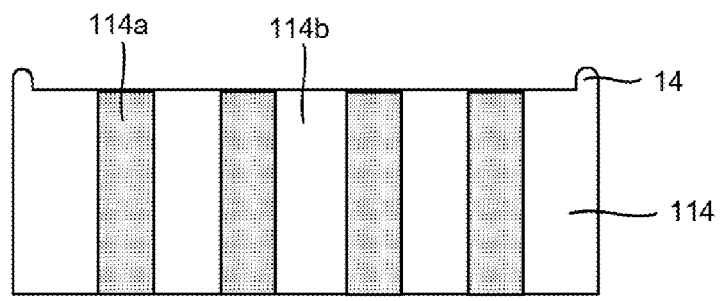

FIG. 7*a*-FIG. 7*b* are schematic diagrams of an elastic connection member also acting as a sealing member according to an embodiment of the present invention. FIG. 7*b* is a cross-sectional view of the elastic connection member taken along the section line A-A' in FIG. 7*a*.

In order to protect the electrical connection positions of the first electrical connection ends 116, the second electrical connection ends 122 and the connection member 114, the edge of the elastic connection member surrounds the above-mentioned electrical connection positions and acts as a sealer.

Preferably, in order to obtain a better seal, the edge of the connection member 114 is provided with a raised structure 14, as depicted in FIG. 7a and FIG. 7b. The dotted frame in FIG. 7a indicates the arrangement range of the conductive areas 114a.

It should be noted that, in this embodiment of the present invention, an additional sealing ring 130 may be provided, as shown in FIG. 2. The sealing ring 130 surrounds the above-mentioned electrical connection positions with dust-proof, moisture-proof, and water-proof functions. The sensor base 111 is also provided with a groove 131 where the sealing ring 130 is placed, so as to achieve a better seal.

It should be noted that, in other embodiments of the present invention, after the transmitter 12 is installed, if the transmitter 12 and the bottom case 10 themselves are well sealed, the sealing ring 130 may not be provided in the detection device.

Figure 8A:
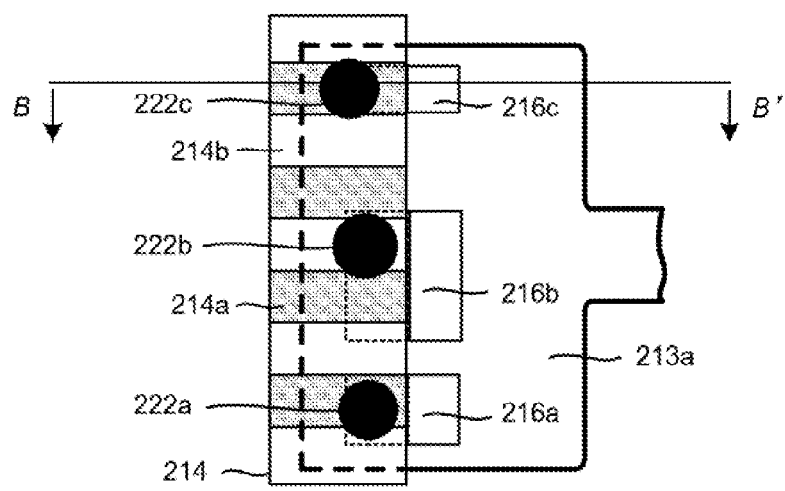
FIG. 8a-FIG. 8b are schematic diagrams of the electrical connection among the connection member, the first electrical connection end and the second electrical connection end according to yet another embodiment of the present invention.
Figure 8B:
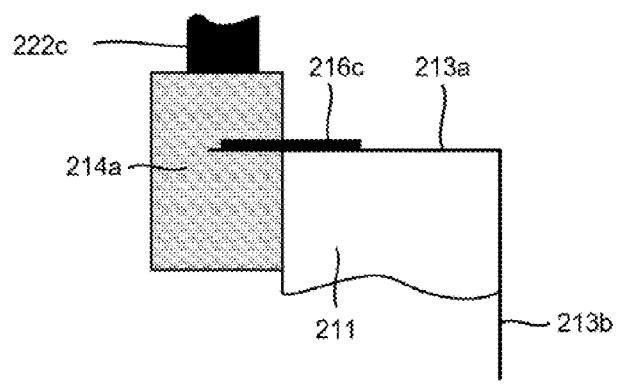

FIG. 8a-FIG. 8b are schematic diagrams of the electrical connection among the connection member 214, the first electrical connection ends and the second electrical connection ends according to another embodiment of the present invention. FIG. 8b is a cross-sectional view taken along the section line B-B' in FIG. 8a.

The three second electrical connection ends 222a, 222b, and 222c of the embodiment of the present invention are electrically connected to the three first electrical connection ends 216a, 216b, and 216c, respectively. The arrangement of the conductive areas 214a and the insulation areas 214b in the connection member 214 is the same as mentioned above.

Specifically, according to FIG. 8b, in the embodiment of the present invention, the signal output portion 213a is embedded in the connection member 214. Therefore, the three first electrical connection ends 216a, 216b, and 216c are all embedded in the connection member 214. In order to fix the position of the sensor, the signal output portion 213a and the detection portion 213b are carried by the sensor base 211.

In this embodiment of the present invention, the principle and method of electrical connection between the connection member 214 and the first electrical connection ends or the second electrical connection ends are the same as described above.

Figure 9A:
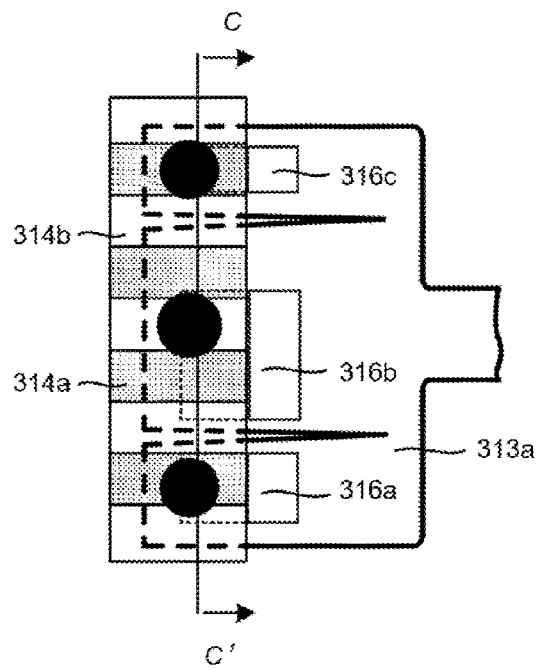
FIG. 9a-FIG. 9b are schematic diagrams of the electrical connection among the connection member, the first electrical connection end and the second electrical connection end according to yet another embodiment of the present invention.
Figure 9B:
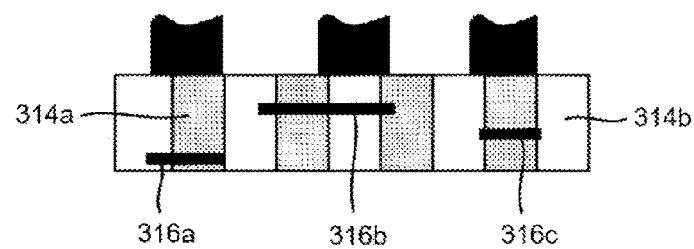

FIG. 9a-FIG. 9b are schematic diagrams of the electrical connection among the connection member, the first electrical connection ends and the second electrical connection ends according to yet another embodiment of the present invention. FIG. 9a is a top view. FIG. 9b is a cross-sectional view taken along the section line C-C' in FIG. 9a.

In the embodiment of the present invention, the three first electrical connection ends 316a, 316b, 316c of the signal output portion 313a are independent of each other and do not interfere with each other. The three first electrical connection ends are all embedded in the conductive area 314a and/or the insulation area 314b of the connection member. As shown in FIG. 9b, in the embodiment of the present invention, the embedding heights of the first electrical connection ends in the connection member are not exactly the same.

In the actual manufacturing process, the thickness of each first electrical connection end will be different. When the transmitter and the sensor are connected, the independent and non-interfering first electrical connection ends can reduce or eliminate the effect of poor contact caused by the above-mentioned thickness difference, improving the reliability of the electrical connection between the three. Preferably, if the connection member is an elastic connection member, the above-mentioned problem of poor contact can be effectively avoided.

Obviously, in other embodiments of the present invention, it is possible that only two out of the three first electrical connection ends are embedded in the connection member, while the third one is not embedded, which is not specifically limited herein.

Figure 10A:
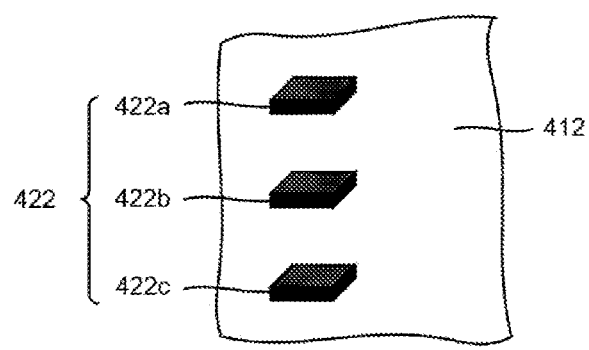
FIG. 10a is a schematic diagram of the second electrical connection end according to yet another embodiment of the present invention.
Figure 10B:
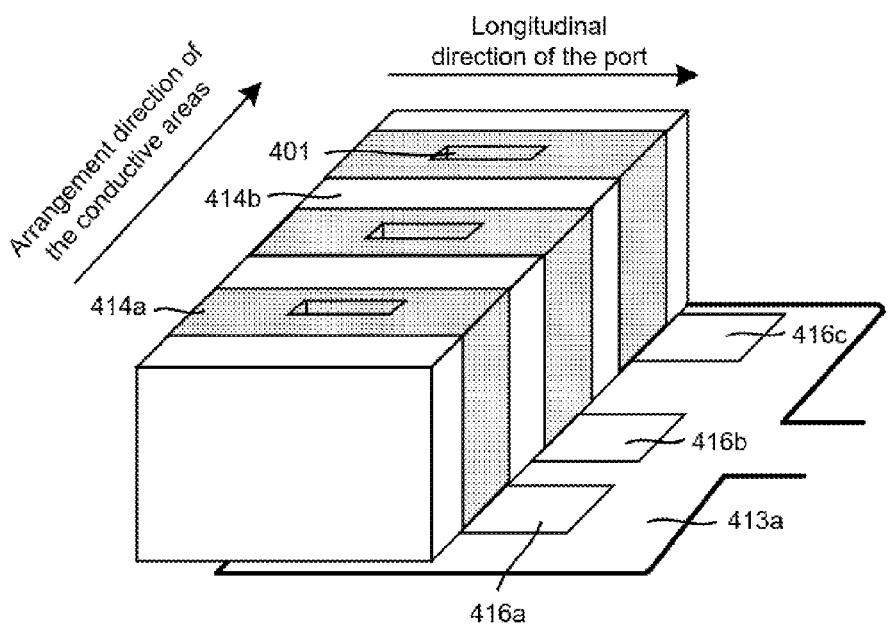

FIG. 10a is a schematic diagram of the second electrical connection ends 422 according to yet another embodiment of the present invention. FIG. 10b is schematic diagram of the connection member and the signal output end 413a matched with the second electrical connection ends 422 in FIG. 10a.

The three second electrical connection ends 422a, 422b, and 422c are plugs that protrude from the transmitter case 412. The type of plugs is as described above. Three ports 401 are provided in the connection member to cooperate with the three second electrical connection ends. The three second electrical connection ends can be respectively inserted into corresponding ports 401.

In the embodiment of the present invention, the longitudinal direction of the port 401 is perpendicular to the arrangement direction of the conductive areas 414a or the insulation areas 414b. In other embodiments of the present invention, the two directions can be flexibly designed according to requirements. As in one embodiment of the present invention, the longitudinal direction of the port is parallel to the arrangement direction of the conductive areas. The principle and method of electrical connection is the same as mentioned above.

In the detection device of prior art, multiple separated conductive components and/or multiple separated insulation components are provided between the transmitter and the sensor, and one component has only one single function, which increases the complexity of the internal structure of the detection device. At the same time, the reliability of the electrical connection between the transmitter and the sensor is poor, which is prone to signal interruption and data loss.

In the detection device of the embodiment of the present invention, a connection member that simultaneously performs conduction and insulation functions is provided between the transmitter and the sensor, which reduces the complexity of the internal structure of the detection device, makes the internal structure of the detection device more compact, and improves the integration of the detection device.

In summary, the present invention discloses a highly integrated analyte detection device, in which a connection member that simultaneously performs conduction and insulation functions is provided between the transmitter and the sensor, reducing the complexity of the internal structure of the detection device, making the internal structure of the device more compact, improving the integration of the detection device, and greatly enhancing the user experience.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

The invention claimed is:

1. An analyte detection device, comprising:
   a bottom case;
   a sensor, assembled on the bottom case, wherein the sensor comprises a signal output portion and a detection portion, and the signal output portion is provided with at least two first electrical connection ends;
a transmitter, fastened with the bottom case, wherein the transmitter is provided with at least two second electrical connection ends which correspond to the first electrical connection ends; and
a connection member, arranged between the first electrical connection ends and the second electrical connection ends, wherein the connection member comprises at least two conductive areas and at least one insulation area, and the insulation area is provided between two adjacent conductive areas of the at least two conductive areas, and at least two first electrical connection ends, through different conductive areas of the at least two conductive areas, are respectively electrically connected to corresponding second electrical connection ends of the second electrical connection ends, and the first electrical connection ends or the second electrical connection ends are respectively electrically connected to the different conductive areas,
wherein at least one of the first electrical connection ends is embedded inside the connection member, the first electrical connection ends are independent of each other and do not electrically interfere with each other, and an embedding heights of the first electrical connection ends in the connection member relative to the corresponding second electrical connection ends are not exactly the same.

2. An analyte detection device of claim 1, wherein the second electrical connection ends are metal contact pins.

3. An analyte detection device of claim 2, wherein the second electrical connection ends are protruding metal contact pins with spherical tops.

4. An analyte detection device of claim 3, wherein the connection member is provided with concave portions that cooperate with the spherical tops of the protruding metal contact pins.

5. An analyte detection device of claim 2, wherein the metal contact pins are provided inside the transmitter, and the connection member is provided with protrusions that cooperate with the metal contact pins.

6. An analyte detection device of claim 1, wherein the second electrical connection ends are protruding plugs.

7. An analyte detection device of claim 6, wherein the connection member is provided with ports that cooperate with the protruding plugs.

8. An analyte detection device of claim 1, wherein the conductive areas and the insulation area expand across the connection member in a vertical direction, respectively.

9. An analyte detection device of claim 1, wherein one of the first electrical connection ends and one of the corresponding second electrical connection ends share a common part of the conductive areas.

10. An analyte detection device of claim 9, wherein the common part of the conductive areas comprises a portion of one of the conductive areas, or one of the conductive areas, or some conductive areas.

11. An analyte detection device of claim 1, wherein the insulation area is spaced between any two first electrical connection ends of the first electrical connection ends or any two second electrical connection ends of the second electrical connection ends connected to the connection member, the at least one insulation area comprises insulation areas, and the insulation area comprises a portion of one of the insulation areas, or one of the insulation areas, or some of the insulation areas.

12. An analyte detection device of claim 1, wherein the connection member is an elastic connection member.

13. An analyte detection device of claim 12, wherein a number of the first electrical connection ends and a number of the second electrical connection ends are both three.

14. An analyte detection device of claim 12, wherein an edge of the elastic connection member surrounds positions where the first electrical connection ends and the second electrical connection ends are electrically connected with the elastic connection member, respectively.

* * * * *